United States Patent
Anand et al.

(10) Patent No.: US 10,242,145 B1
(45) Date of Patent: Mar. 26, 2019

(54) OPTIMIZING A POWER GRID FOR AN INTEGRATED CIRCUIT

(71) Applicant: Cadence Design Systems, Inc., San Jose, CA (US)

(72) Inventors: Harpreet Singh Anand, San Diego, CA (US); Paul W. Kollaritsch, Solana Beach, CA (US); Mohan Kumar Chalamalashatty, San Diego, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 15/585,607

(22) Filed: May 3, 2017

(51) Int. Cl.
*G06F 17/50* (2006.01)

(52) U.S. Cl.
CPC ...... *G06F 17/5072* (2013.01); *G06F 2217/78* (2013.01)

(58) Field of Classification Search
CPC .......... H01L 23/49838; H01L 27/0207; H01L 23/544; H01L 21/823475; H01L 21/823871; G06F 1/163; G06F 3/00; G06F 3/017; G06F 3/013; G06F 3/014; G06F 17/5036; G06F 17/5077; G06F 17/5068; G06F 17/5072
USPC ................................................ 716/118–125
See application file for complete search history.

(56) References Cited

U.S. PATENT DOCUMENTS

| | | | |
|---|---|---|---|
| 8,245,172 B2 | 8/2012 | Hsu | |
| 8,595,681 B1 | 11/2013 | Thirunavukarasu et al. | |
| 8,707,228 B1 | 4/2014 | Kollaritsch et al. | |
| 8,719,743 B1 | 5/2014 | Kollaritsch et al. | |
| 8,812,286 B1 | 8/2014 | Lin et al. | |
| 2006/0095870 A1* | 5/2006 | Tai | G06F 17/5068 716/120 |
| 2006/0123376 A1* | 6/2006 | Vogel | G06F 17/5045 716/115 |
| 2007/0094630 A1* | 4/2007 | Bhooshan | G06F 17/5077 716/112 |

* cited by examiner

*Primary Examiner* — Binh Tat
(74) *Attorney, Agent, or Firm* — Foley & Lardner LLP

(57) ABSTRACT

The present embodiments relate generally to creating power grids for complex integrated circuits having many power domains, macros, and secondary power regions. In some embodiments, a power grid compiler translates a high level description of a power grid into base-level commands that can be used by other tools to implement the wires and vias of the power grid. In these and other embodiments, the high level description comprises a terse, high-level, process technology dependent and design/chip independent language for describing the grid of power and ground wires and vias, including their connections to macros and a multitude of complex power nets that are typical in recent day SOCs. According to certain additional aspects, embodiments include a power grid optimizer for optimizing portions of a power grid based on analytics such as QOR analytics, and incrementally updating the power grid to include these optimized portions.

16 Claims, 13 Drawing Sheets

```
subgrid -name SUBGRID5_PAMvar1
  layer -name M6var1 _subgrid SUBGRID5_PAMvar1
    stripe -layer M6var1 -gnet PAMvar1 -pitch ...
    stripe -layer M6var1 -gnet GAC -pitch ...

#End macro subgrid...   start core grid description:

layer -name M7
  stripe -name S7pan -layer M7 -gnet PSC -pitch ...
    stripeswap -stripe S7pam -gnet PAMvar1 \
      -over_subgrid SUBGRID5_PAMvar1
  stripe -name S7gac -layer M7 -gnet GAC -pitch ...
```

302

```
createRouteBlkg    Box1 -name tmpRtBlkg
createRouteBlkg    Box3 -name tmpRtBlkg
createRouteBlkg    Box4 -name tmpRtBlkg
setAddStripeMode    -bottom_via_layer M5    -top_via_layer M6
addStripe -layer M6 -net vddp -pitch ...
addStripe -layer M6 -net vss  -pitch ...
deletRouteBlkg -name tmpRtBlkg
createRouteBlkg    Box1 -name tmpRtBlkg
createRouteBlkg    Box2 -name tmpRtBlkg
createRouteBlkg    Box3 -name tmpRtBlkg
setAddStripeMode    -bottom_via_layer M5    -top_via_layer M6
addStripe -layer M6 -net vddm -pitch ...
addStripe -layer M6 -net vss  -pitch ...
deletRouteBlkg -name tmpRtBlkg
createRouteBlkg    Box2 -name tmpRtBlkg
createRouteBlkg    Box4 -name tmpRtBlkg
setAddStripeMode    -bottom_via_layer M6    -top_via_layer M7
addStripe -layer M7 -net vdds -pitch ...
deletRouteBlkg -name tmpRtBlkg
createRouteBlkg    Box1 -name tmpRtBlkg
createRouteBlkg    Box3 -name tmpRtBlkg
createRouteBlkg    Box4 -name tmpRtBlkg
setAddStripeMode    -bottom_via_layer M6    -top_via_layer M7
addStripe -layer M7 -net vddp -pitch ...
deletRouteBlkg -name tmpRtBlkg
createRouteBlkg    Box1 -name tmpRtBlkg
createRouteBlkg    Box2 -name tmpRtBlkg
createRouteBlkg    Box3 -name tmpRtBlkg
setAddStripeMode    -bottom_via_layer M6    -top_via_layer M7
addStripe -layer M7 -net vddm -pitch ...
deletRouteBlkg -name tmpRtBlkg
createRouteBlkg    Box2 -name tmpRtBlkg
createRouteBlkg    Box4 -name tmpRtBlkg
setAddStripeMode    -bottom_via_layer M6    -top_via_layer M7
addStripe -layer M7 -net vss -pitch ...
deletRouteBlkg -name tmpRtBlkg
createRouteBlkg    Box1 -name tmpRtBlkg
createRouteBlkg    Box3 -name tmpRtBlkg
createRouteBlkg    Box4 -name tmpRtBlkg
setAddStripeMode    -bottom_via_layer M6    -top_via_layer M7
addStripe -layer M7 -net vss -pitch ...
deletRouteBlkg -name tmpRtBlkg
createRouteBlkg    Box1 -name tmpRtBlkg
createRouteBlkg    Box2 -name tmpRtBlkg
createRouteBlkg    Box3 -name tmpRtBlkg
setAddStripeMode    -bottom_via_layer M6    -top_via_layer M7
addStripe -layer M7 -net vss -pitch ...
deletRouteBlkg -name tmpRtBlkg
```

```
proc myCmd {gridCell_x gridCell_y domain} {         ———— 508
    set gx $gridCell_x;    set gy $gridCell_y
    set G0  [optGrid_get_gridName_for_domain_from_index  $domain 0]
    set G1  [optGrid_get_gridName_for_domain_from_index  $domain 1]
    set G2  [optGrid_get_gridName_for_domain_from_index  $domain 2]
    set gridName     [optGrid_gx_gy_2_misc_gridName            $gx $gy $domain]
    set pcnt_irDrop  [optGrid_gx_gy_2_irDrop_max_percent       $gx $gy]
    set num_trks_tot [optGrid_gx_gy_2_cong_num_tracks_total    $gx $gy]
    set pcnt_cong    [optGrid_gx_gy_2_cong_percent             $gx $gy]
    set WNS          [optGrid_gx_gy_2_timing_WNS               $gx $gy]
    set gridName_NEW $gridName
    if {$gridName==$G2} {
        if {$pcnt_irDrop>0.20} {
            set gridName_NEW $G3
        } elseif {$pcnt_irDrop>0.10 && $WNS<-0.100} {
            set gridName_NEW $G3
        } elseif {$pcnt_irDrop<0.05 && $pcnt_cong>1.4 && $num_trks_tot>10} {
            set gridName_NEW $G1
        } elseif { .... }
    } else { .... }
    return $gridName_NEW
}
setOptGridMode -tcl_get_new_gridName_for_gridCell myCmd
optGrid ———— 514
```

{ 510 — lines for set gridName through set WNS }

{ 512 — if/elseif block }

FIG. 5B

| optGrid_get_gridName_for_domain_from_index | $domain | <integer> |
|---|---|---|
| optGrid_gx_gy_2_misc_gridName | $gx $gy | [$domain] |
| optGrid_gx_gy_2_misc_instPtrs | $gx $gy | [$domain] — 516 |
| optGrid_gx_gy_2_cong_num_tracks | $gx $gy | [$layer] |
| optGrid_gx_gy_2_cong_num_tracks_horz | $gx $gy | [$layer] |
| optGrid_gx_gy_2_cong_num_tracks_vert | $gx $gy | [$layer] |
| optGrid_gx_gy_2_cong_num_tracks_used | $gx $gy | [$layer] — 518 |
| optGrid_gx_gy_2_cong_num_tracks_used_horz | $gx $gy | [$layer] |
| optGrid_gx_gy_2_cong_num_tracks_used_vert | $gx $gy | [$layer] |
| optGrid_gx_gy_2_cong_percent | $gx $gy | [$layer] |
| optGrid_gx_gy_2_cong_percent_horz | $gx $gy | [$layer] |
| optGrid_gx_gy_2_cong_percent_vert | $gx $gy | [$layer] |
| optGrid_gx_gy_2_cong_num_drcs | $gx $gy | [$layer] |
| optGrid_gx_gy_2_timing_TNS | $gx $gy | $view [$domain] |
| optGrid_gx_gy_2_timing_WNS | $gx $gy | $view [$domain] — 520 |
| optGrid_gx_gy_2_rail_voltage_external | $gx $gy | [$domain] |
| optGrid_gx_gy_2_rail_voltage_lowest | $gx $gy | [$domain] |
| optGrid_gx_gy_2_rail_percent | $gx $gy | [$domain] |

FIG. 5C

```
::qcom_ns_pg::cci_qcom_power_repair  -new_pg_grid_name  grid5 \
                                     -boxes             {{161.94 965.79 223.14 986.79} ...}
::qcom_ns_pg::cci_qcom_power_repair  -new_pg_grid_name  grid15 \
                                     -boxes             {{19.14 1154.79 39.54 1259.79} ...}
```

OPTIMIZING A POWER GRID FOR AN INTEGRATED CIRCUIT

TECHNICAL FIELD

The present invention relates generally to integrated circuits, and more particularly to techniques for generating one or more optimal power grids for various sub-chips or blocks of an integrated circuit.

BACKGROUND

Design engineers design integrated circuits (IC's, e.g. application specific integrated circuits (ASICs) or systems on chips (SOCs)) by transforming logical or circuit descriptions of the IC's into geometric descriptions, called layouts. IC layouts typically include (1) circuit modules (i.e., geometric representations of electronic or circuit IC components) with signal pins, and (2) interconnect lines (i.e., geometric representations of signal wiring) that connect the signal pins of the circuit modules.

Each IC also contains a power grid structure that provides power and ground to each electronic and circuit component of an IC. Each electronic or circuit IC component has a power pin and a ground pin that is connected to the power grid structure. Power grid structure components include stripes, rails, and vias which must be of a certain strength (i.e., size) to meet design specifications (i.e., minimum specifications that the power grid structure must meet in order to be acceptable for use in the IC).

To create layouts and to physically implement these designs, design engineers typically use electronic design automation ("EDA") applications or tools. Such tools can include floorplanning tools that assign sub-chips or blocks of circuit modules in the design to target layers and regions of the IC. Typically, each sub-chip or block requires its own power domain and power grid. Usually, a designer needs to code the power grid for each sub-chip (block), which could number more than 100 blocks for a single IC, and so a designer would need to manually generate more than 100 separate and unique routines. If any changes are required to any portion of a power grid, these changes must also be done manually and for the entire grid. Existing software in the industry allows only uniform one-size-fits-all distribution of power grid, and lacks the capability to dynamically reconfigure the power grid with any desired changes. Accordingly, in view of these and other problems, improvements are needed.

SUMMARY

The present embodiments relate generally to creating optimal power grids for complex integrated circuits having many power domains, macros, and secondary power regions. In some embodiments, a power grid compiler translates a high level description of a power grid into base-level commands that can be used by other tools to implement the wires and vias of the power grid. In these and other embodiments, the high level description comprises a terse, high-level, process technology dependent and design/chip independent language for describing the grid of power and ground wires and vias, including their connections to macros and a multitude of complex power nets that are typical in recent day SOCs. According to certain additional aspects, embodiments include a power grid optimizer for optimizing portions of a power grid based on analytics such as Quality of Results (QOR) analytics, and incrementally updating the power grid to include these optimized portions which improve QOR.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIGS. 3A to 3E are diagrams illustrating example aspects of a high level description of a power grid according to embodiments, as well as how a power grid compiler according to the embodiments generates a power grid from the high level description;

FIGS. 5A to 5D illustrate example user interface constructs for power grid optimization according to embodiments.

DETAILED DESCRIPTION OF THE PREFERRED EMBODIMENTS

Figure 1:
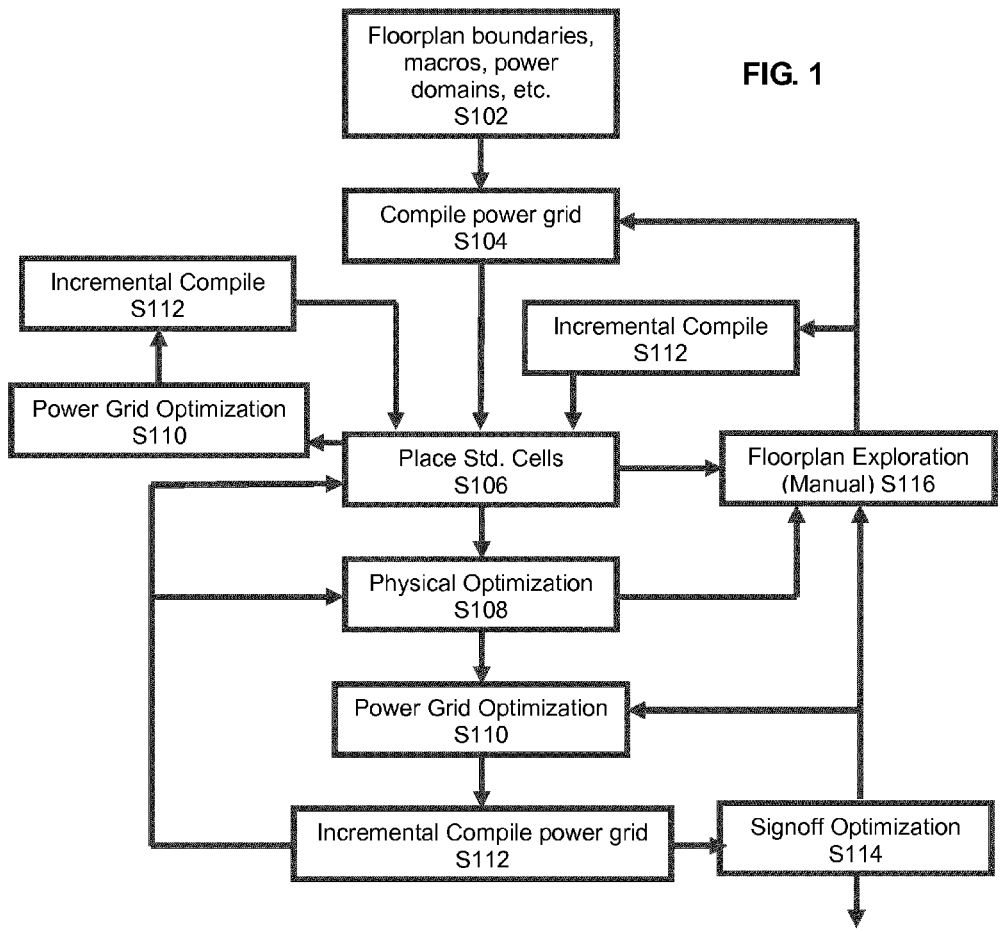
FIG. 1 is a diagram illustrating an example process flow in which the present embodiments can be included.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain aspects, the present applicants recognize that conventional methods for creating and implementing power grids in ICs such as ASICs and SOCs are labor-intensive and unsatisfactory. For example, a designer typically needs to manually code a routine containing a multitude of low level, Power Grid Assembly Language-like (PGAL) commands for each sub-chip (block), which can number more than 100 blocks for a single IC, and so would need more than 100 separate and unique routines. These PGAL commands are then executed by existing IC EDA tools to produce the wires and vias which make up the power grid.

Not only is this very labor intensive and error-prone, if a region of a sub-chip's power grid needs to be changed or optimized (e.g. for better Quality of Results (QOR)), then there are generally only two choices. First, the sub-chip's PGAL routine must be enhanced with a new grid specification for each region of change and then the resulting PGAL routine would need to be re-run to regenerate the grid for the sub-chip. This is very time-consuming (i.e. 100 sub-chip scripts times 10 regions of change per sub-chip=1000 power grid script enhancements). Alternatively, wires/vias would need to be manually added to/removed from the original grid. Both approaches, changing PGAL routines or changing the wires and vias directly, are manual and make it impractical for design companies to incorporate power grid changes when there are tight tape-out delivery schedules. In these cases, most of the designs are taped-out with significantly sub-optimal power grids.

Accordingly, the present embodiments relate generally to more efficiently creating power grids for complex integrated circuits having many power domains, macros, and secondary power regions. In some embodiments, a power grid compiler translates a high level description of a power grid into base-level commands that can be used by other tools to implement the wires and vias of the power grid. These and other embodiments further include a power grid optimizer for optimizing portions of a power grid based on analytics such as QOR analytics, and incrementally updating the power grid to include these optimized portions.

FIG. 1 is a diagram illustrating an example integrated circuit design process flow in which power grids can be generated using techniques according to the present embodiments. It should be preliminarily noted, however, that the embodiments are not limited to being practiced in flows having all of these steps, or in the order shown.

As shown, an example process flow includes a step S102 in which an initial floorplanning for an integrated circuit design is performed. This includes identifying locations and boundaries within the integrated circuit design for all the sub-chips or blocks, all the macrocells (i.e. macros), the power domain regions, and so forth. This can be done with standard floorplanning tools known to those skilled in the art.

In a next step S104, the power grid for each of the blocks is compiled. As will be described in more detail below, this includes providing a single high-level description of the power grid and automatically generating the PGAL commands which standard floorplanning tools can execute to create the actual wires and vias that form the power grid from this high-level description.

In step S106, the standard cells of the integrated circuit design are placed in accordance with the floorplanning locations and boundaries defined in step S102, for example using placement tools known to those skilled in the art. Then in step S108, a physical optimization is performed to refine the netlist, sizes and placement of standard cells from step S106, and connections (wires and vias) are formed. This can be done using conventional optimization tools and in accordance with physical design QOR factors such as IR drop, congestion, timing (performance of the block), power consumption, electromigration, die yield, etc. When these steps S106 and S108 have been completed, a power grid optimization according to embodiments is performed in step S110. Example ways that this optimization can be done will be described in more detail below.

As a result of power grid optimization, one or more portion(s) of the power grid may be identified for repair. According to aspects of the embodiments, these portion(s) can be incrementally re-compiled in step S112 using alternative high-level descriptions without changing other regions of the power grid. These incremental changes can be performed to a previously-generated power grid by region, power domain, sub-grid, layer, and/or net name. For example, a sub-chip/block whose floorplan has changed (i.e. macros have been moved, design boundaries have moved, power requirements have increase/decreased, secondary power is now required, etc.) leaving the grid outside the changed area untouched, properly connecting the newly generated grid in the changed area, all without having to regenerate the entire grid, thus saving runtime. Example aspects of how this can be performed are described in more detail in co-pending U.S. application Ser. No. 15/585,623, the contents of which are incorporated herein by reference in their entirety. After this incremental compile of the identified portion(s), the process can return to step S108 or S106 where placement or physical optimization can be performed again with the newly compiled regions.

Otherwise, if power grid optimization in S110 does not identify any further regions of the power grid needing to be changed, a final signoff optimization is performed in step S114. This step can be performed using conventional signoff optimization tools, and can include more accurate analysis of physical parasitics, timing, power and other QOR metrics and optimization based on these more accurate QOR metrics. If sign-off results from step S114 meet design requirements, then no further power grid optimization is required. If not, then Power Grid Optimization could be revisited by returning to step S110. Moreover, as shown in the example flow of FIG. 1, after performing any or all of the placement in step S106, the optimization in step S108, or sign-off optimization in step S112, floorplan exploration can be performed in step S116. This generally involves the designer manually reviewing the results of placement, physical optimization and/or power grid optimization in steps S106, S108 and S110, and further manually adjusting the floorplan boundaries, placement of macrocells and power domain boundary locations from initial step S102, after which the subsequent steps are performed again. Likewise, after standard cell placement is performed in step S106 after returning there from step S112, power grid optimization in step S110 can be revisited, along with an incremental power grid compilation in step S112.

Example aspects of processing performed in connection with compiling power grids according to the present embodiments, such as that performed in step S104 in the example flow described above, will now be described in more detail.

Figure 2A:
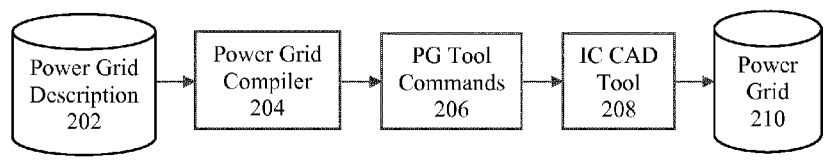
FIG. 2A is a diagram illustrating an example process of compiling a power grid from a high level description of a power grid according to the embodiments.

In embodiments, generating power grids includes receiving a high level description of the power grid for a given process technology, usually from the library/technology group. An example overall methodology according to the embodiments is shown in FIG. 2A. As shown in this example, a high level power grid description 202 for a sub-chip or block is used by a power grid compiler 204 to generate a power grid tool commands 206 for the sub-chip or block.

In embodiments such as that shown in FIG. 2A, the generated power grid tool commands 206 comprise low level commands or scripts (e.g. power grid assembly language-like commands or PGAL) that are used by other EDA tools (e.g. a power grid router) 208 to generate the actual shapes and power/ground nets for the integrated circuit design. These commands include commands such as createRouteBlockage, addStripe, editPowerVia, etc. that are provided by existing tools to implement the actual wires and vias of the power grid 210.

Figure 2B:
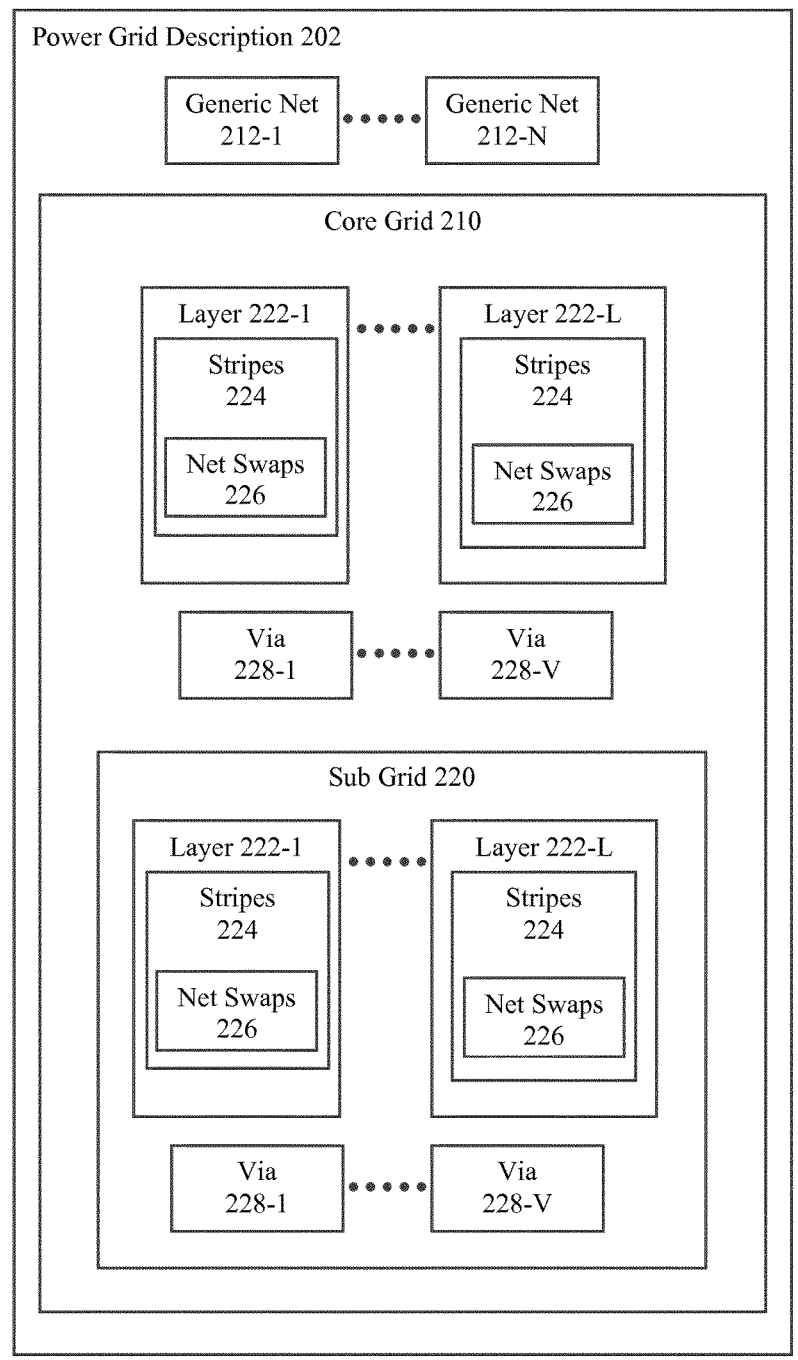
FIG. 2B is a diagram illustrating an example of a high level description of a power grid according to the embodiments.

An example of a high-level power grid description is shown in FIG. 2B. As shown, the description 202 of power grid object points to a core grid object 210 and can include generic nets 212-1 to 212-N. Each core grid object 210 can include one or more sub-grid objects 220.

Embodiments allow for the description of generic nets 212 to also include "generic net names", such as PSC (power for stdcell), GAC (ground), PAC (power always-on), PAM1 (power for memory), PAM2 (different power for memory) etc. In these and other embodiments, these generic nets are mapped to the power nets of the specific sub-chip during its power grid generation (e.g. PSC is mapped to power net 'vdd', PAC is mapped to 'vdd_aon', GAC is mapped to ground net 'vss', etc.). This allows for the power grid description 202 to be high-level, meaning it is design/block independent. In other words, the description of 202 is not hard-coded with a block's power net names as in the PGAL.

Embodiments also allow for generic net name OR'ing. For example, PAC|PSC means "PAC or PSC" the first one which maps to a real net, and so for a non-switchable power domain where PAC is mapped to 'UNUSED' (which means maps to no net) and PSC is mapped to 'vdd', so PAC|PSC maps to the actual net for PSC, 'vdd'. For a switchable power domain, both PAC and PSC are mapped to actual nets, so PAC|PSC will get mapped to the actual net name represented by PAC.

As shown in the example of FIG. 2B, core grid 210 and each sub-grid 220 can include instances of layer objects 222-1 to 222-L and via objects 228-1 to 228-V.

The description of each layer 222 can include a LEF metal name, a width, a pitch, an offset origin, and multiple stripe objects 224. Each stripe object 224 for a layer can be specified as corresponding to one of the generic nets 212 in the core grid 210, and can further include a width, an offset, an offset origin, a pitch specification that specifies a spacing between stripes—generally all the information needed to generate grid wire(s). If a layer and a stripe has the same attribute (i.e. width) with a different value, then the stripe's value will override the layers value. For example, usually, the layer contains the width setting and occasional one of its stripes will have a width value overriding the layer's value.

As shown in this example, a stripe object 224 can contain zero or more "generic net swap" objects 226. For example, a core grid layer's stripe object 224 could be specified for the "generic net name" PSC, but can also contain a "generic net swap" object, in which case over the sub-grid 220 it can specify the generic net to be used to be PAC instead. Stripe object 224 could contain multiple "generic net swap" objects, for example two "generic net swap" objects, one to swap to generic net PAC over sub-grid A, and one to swap to generic net PAM1 over sub-grid B.

A layer 222 can be marked as a "via guide", so that the power grid compiler produces PGAL commands to create (temporary) stripes which will also create vias, and then produces PGAL commands to delete these temporary stripes (leaving the vias). This concept allows via stacks to be "guided" to controlled, specific location. Regular vias (e.g. for a stripe which orthogonally intersects stripes and macro cell pins) can be specified as a predefined LEF via, predefined LEF viaRule, or as "generate". Also, non-orthogonal vias can be specified (i.e. vias between co-aligned wires of different layers).

Sub-grids 220 can be 1) over specified memory/partition macro, 2) over specified regions of the core grid 210, or 3) specified for secondary power. So, correspondingly, sub-grids are marked one of three types: 1) macro, 2) region, 3) secondary power. For example, a sub-grid 220 can be specified over macros by matching the pins/nets/layers of the macro. For example, if a memory macro contains pins of layer M7 connecting to PAM1 and GAC, it will only be matched up if a sub-grid exists which is of type "macro", and contains layer M7 with two stripes, one stripe with generic net PAM1 and one stripe with generic net GAC. Note that these M7 stripes will have width=0 (and no pitch nor offset defined) so that no new M7 stripes are created which would conflict with the already existing M7 pins. These zero-width stripes are only used to uniquely identify a macro to a macro sub-grid. Furthermore, this sub-grid could either 1) have a higher metal layer(s) (i.e. M8) with PAM1 and GAC stripes to connect the M7 macro pins or 2) no additional metal layers, relying on, for example, M10 core stripes to connect the M7 macro pins.

Further, a sub-grid 220 can be specified over specified regions by marking it as type 'region' and providing a prefix of, for example, a placement density blockage (typically of very low percentage so as not to influence the place and route results) used to specify its boundaries. For example, if there exists a placement density screen named "region_sub_grid_for_extra_M9_PSC_1", and a sub-grid of type 'region' containing density screen name_prefix="region_sub_grid_for_extra_M9 PSC_", that sub-grid will match that density screen and be used to specify extra layer M9 stripes in that region.

In addition, sub-grid 220 can be specified for secondary power by marking it type="secondary power" and, for example, setting its inst group name_prefix="2nd_pg_", and adding a M9 layer with stripes of generic net names "PSC", and "PAC". During initial floorplanning step S102, the, designer could create an instance group, naming it "2nd_pg_B", assigning to it instances requiring secondary power (such as level shifters, AO buffers, etc.), and create a region (which has a rectilinear boundary) for the instance group. The power grid compiler 204 will match that secondary power sub-grid with that instGroup (since the prefix matches), and the primary and secondary powers of the instances in that inst group match generic net names "PSC" and "PAC". Then the extra stripes specified in that secondary power sub-power grid will be generated in that region creating wires to that secondary power required by those instances so they can be connected.

Figure 3B:
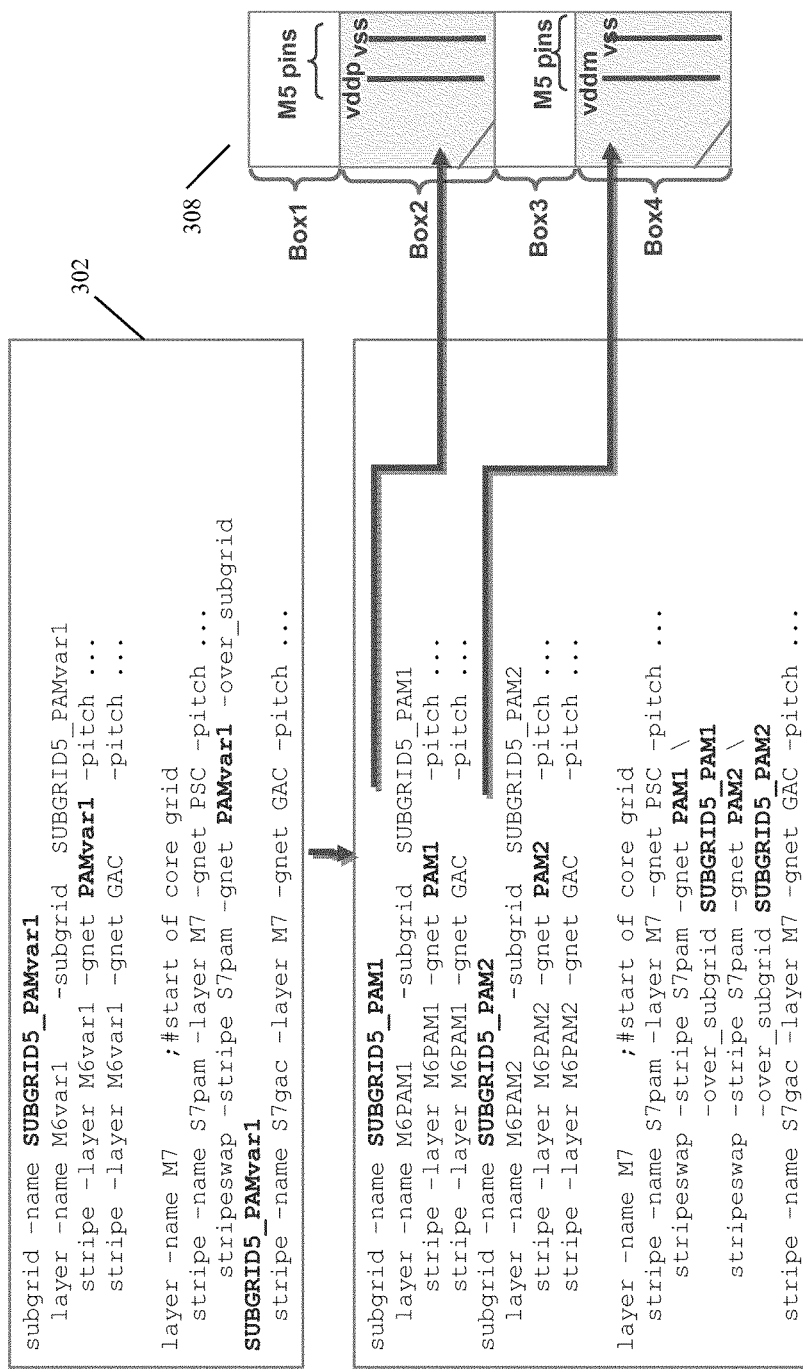
Figure 3C:
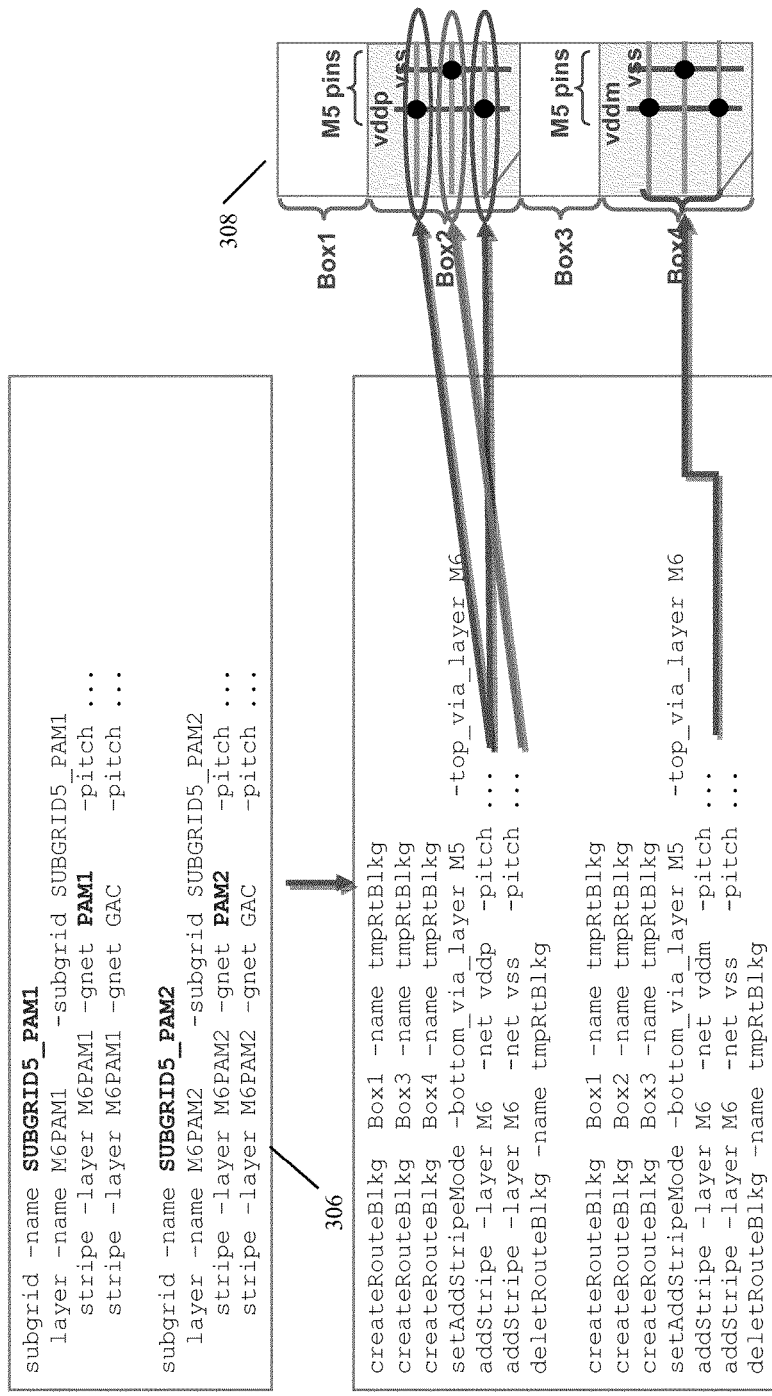
Figure 3D:
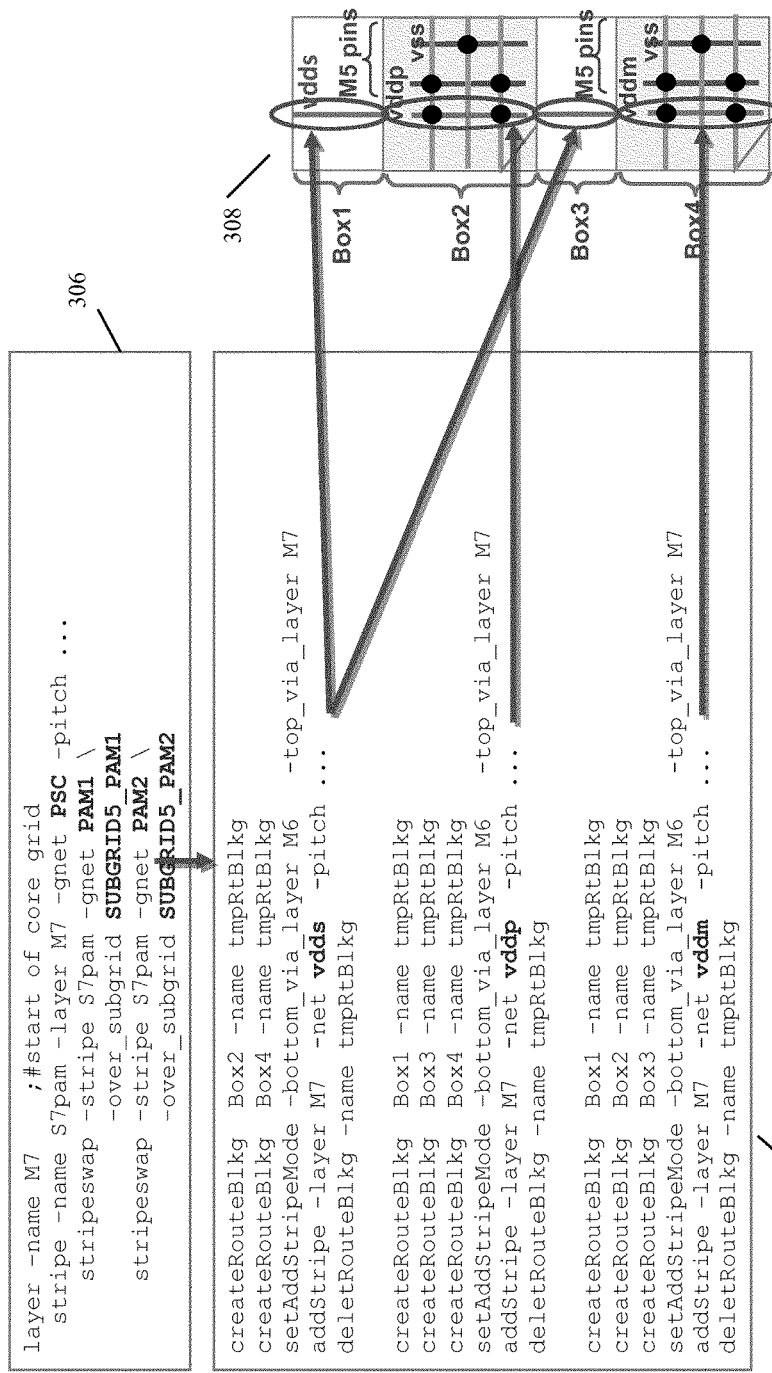

The sub-grid 220 ties into and can modify the core grid 210 stripes, or add extra stripes over the region specified by the sub-grid (see FIG. 3D). Secondary power sub-grids 220 are matched to instance group regions by prefix name specified in the sub-grid object. Macro sub-grids 220 are matched to macros which contain the same nets of the same top pin layer specified by the sub-grid. Any power net connecting to a macro which has not already been mapped to PSC, PAC, GAC, will get mapped to PAM (Power over memory), PAM2, PAM3 . . . . Since there can be over 100 PAMs in one sub-chip/block, this can lead to millions of sub-grid definitions (i.e. SubGrid_PAM_PAM2_PAM3, SubGrid_PAM8_PAM43_PAM78, etc.). However, less than 100 will actually be used in a block.

Embodiments of sub-grid description 220 can include a "template sub-grid" which can minimize the number of combinations of sub-grids to specify and thus drastically reduce the number of lines required in the overall description 202. And since this is a high level description, it can be made design independent so that only one sub-grid template needs to be specified to handle all the 100+sub-chips/blocks of a design/IC (including the top/chip level) and the hundreds of blocks of completely unrelated designs/ICs of the same process technology.

For example, description 220 can include a single template sub-grid SubGrid_PAMvar1_PAMvar2_PAMvar3, and then the actual sub-grids used by a block (SubGrid_PAM27_PAM32_PAM55, SubGrid_PAM8_PAM43_PAM78, etc.) will be generated on the fly during the power grid compilation for that block.

Compiler 204 converts the high-level design-independent description 202 into the design specific, base-level commands 206 which are used by existing IC CAD Tools 208 to generate the power grid according to specifications for only this design. There are typically two or three power grids 202 defined for a process technology. Each power domain within a block will have rectilinear boundaries defining its extents and a power grid associated with that power domain. For each power domain, compiler 204 generates the PG Tools Commands 206 to implement the sub-grids for macros, secondary power grids for instance groups, and sub-grids for regions and then the compiler 204 generates the PG Tool Commands 206 to implement the core grid which also goes over the sub-grid to ensure all sub-grids are connected, attaching these sub-grids to the core grid.

Compiler 204 maps the generic net 212 names to actual power net names in the current block, by examining all the instances of macros, and making a list of all the actual power nets which connect to those macros. Power nets which have already been mapped earlier (i.e. PAC=vdd, PSC=vddswitching, PSC=vddaon, PSC2=vddaon2, etc.) will be removed from the list, and the remaining nets on the list will be mapped to PAM1 thru PAMN, where N is the number of power nets remaining on the list. Compiler 204 also clones template sub-grids 220 (containing variable generic net names), to sub-grids 220 with used generic net names which have mappings to actual net names. For example, assume a template sub-grid 220 included in a description 202 is named with a variable generic net name SubGrid_PAMvar1_PAMvar2_PAMvar3, and that the block netlist has power nets which power grid compiler 204 maps to (during power grid compilation) the generic nets 212 named PAM27, PAM32 and PAM55 connecting to a first macro, and generic nets 212 PAM8, PAM43 and PAM78 connecting to a second macro. Compiler 204 clones this template sub-grid object, SubGrid_PAMvar1_PAMvar2_PAMvar3, to a first sub-grid associated with the first macro, renames this first copy to SubGrid_PAM27_PAM32_PAM55, and substitutes variable generic net name PAMvar1 with PAM27, PAMvar2 with PAM32, PAMvar3 with PAM55 at all places in the first sub-grid description 220. Compiler 204 also clones this template sub-grid object, SubGrid_PAMvar1_PAMvar2_PAMvar3, to a second sub-grid associated with the first macro, renames this second copy to SubGrid_PAM8_PAM43_PAM78, and substitutes variable generic net name PAMvar1 with PAM8, PAMvar2 with PAM43, and PAMvar3 with PAM78 at all places in the second sub-grid description 220. So, the cloning creates new, non-template sub-grids.

It should be noted that the high level description according to embodiments, using variable names and the like as described above, allows for a single high level description to be used in many different IC designs having the different sub-chips or blocks and different power net names and using the same process technology. For example, the generic net names used in the single high level PG description can be mapped to the specific, yet different net names of each chip and its sub-blocks.

Example aspects of a description 202 and power grid compiler 204 according to some example embodiments will now be described in connection with FIGS. 3A to 3E.

As shown in FIG. 3A, a portion of a high level, chip and sub-chip independent grid description 302 is compiled into low level, chip/sub-chip specific, PGAL commands 304. As can be seen, according to aspects of the embodiments, the description 302 is substantially more terse and compact than the PGAL commands used to implement grid 304. It should be noted, however, that the present embodiments are not limited to the specific examples of description 302 that are shown in these FIGS. 3A to 3E, and that many variations are possible.

FIG. 3B illustrates an example of how compiler 204 duplicates a sub-grid template in 302 into actual sub-grid descriptions to remove the variables. More particularly, the sub-grid template in description 302 with the variable generic net name "SUBGRID5_PAMvar1" is duplicated twice to create a new description 306 which includes sub-grids with actual generic net names PAM1 and PAM2. Similarly, the single stripeswap of the core grid M7 layer is cloned twice, one substituting variable generic net PAMvar1 to generic net PAM1, and the second cloned stripeswap substituting variable generic net PAMvar1 to generic net PAM2. This new description 306 is temporary and only generated on-the-fly during this specific sub-chip PG compilation and thus is forgotten at the end of the PG compilation.

FIG. 3B further illustrates an example of how description 306 is used by compiler 204 to generate assembly language like commands that can be used by other power grid tools to implement a power grid 308. As shown, in this example, the generic net name for GAC in description 306 has been mapped to the actual ground net for the design, which is vss, the generic net name for PAM1 has been mapped to the actual power net vddp, and the generic net name for PAM2 has been mapped to the actual power net vddm.

As further shown in the example of FIG. 3B, the design is divided into four separate areas called "boxes. Power grid 308 includes Box 1 and Box 3 which are only part of the core grid since they contain no macros (and their associated macro subgrids). Box 2 is considered part of the core grid as well as being a macro associated with subgrid SUBGRID5_PAM1 which contains pins to the first macro in layer M5, Box 2 containing the actual nets vddp (PAM1) and vss (GAC), Box 4 containing pins to the second macro associated with SUBGRID5_PAM2 in layer M5, and Box 4 containing the actual nets vddm (PAM2) and vss (GAC).

Figure 3E:
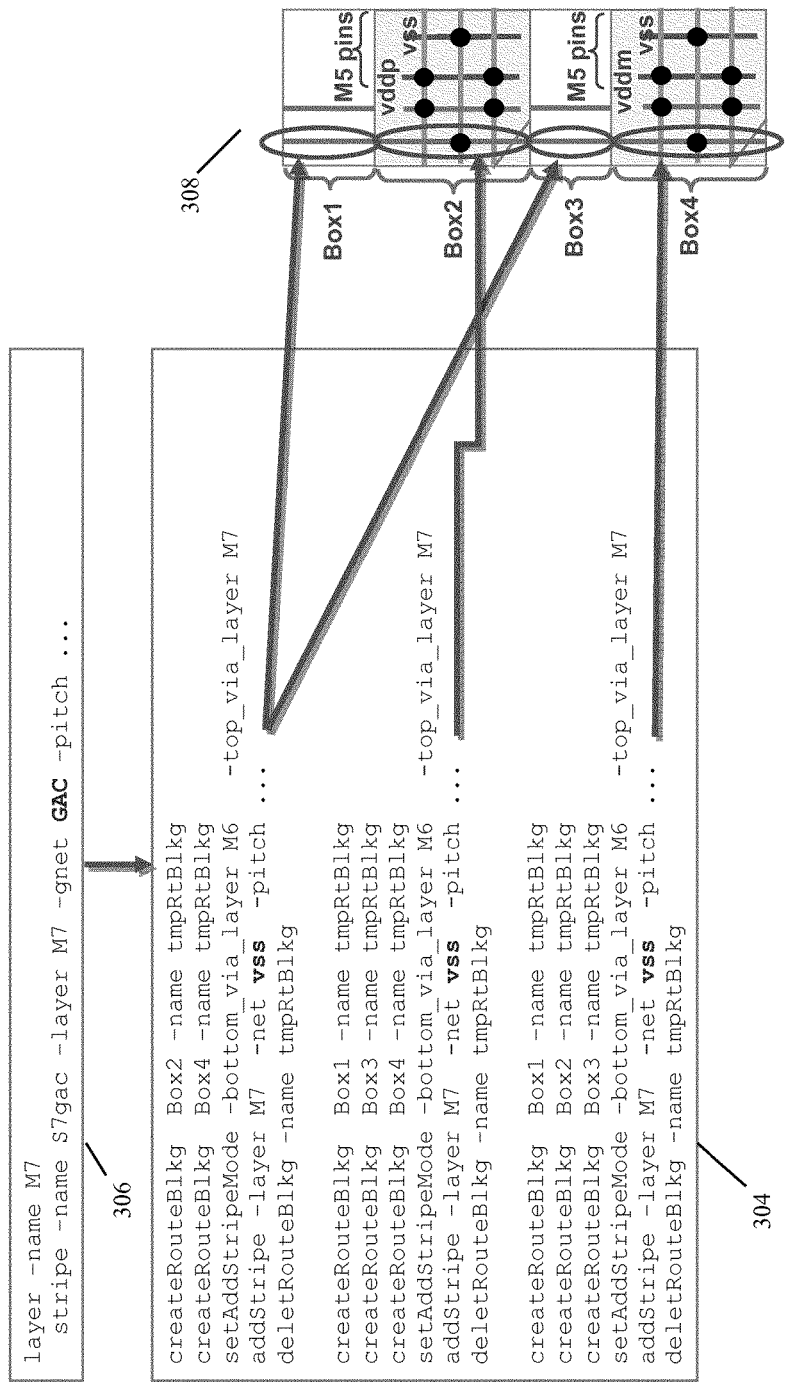

FIG. 3C, 3D, 3E illustrates how the temporary, template-less high level power grid design language 306 is used by compiler 204 to generate PG Tools Commands (PGAL) 304 to implement a portion of grid that is used by other power grid tools 208 to generate stripes and vias for power grid 210. FIG. 3C illustrates an example of how temporary description 306 of the two subgrids corresponding to Box2 and Box4 is used by compiler 204 to generate PG Tools Commands (PGAL) to implement a portion of grid 304 that is used by other power grid tools to generate stripes and vias for power grid 308. More particularly, the stripe descriptions in 306 are mapped to the actual net names, stripes are created in the layers at a pitch specified by the descriptions in 306, and vias are created to connect the M6 stripes to the M5 nets/pins. As shown in the example, PGAL commands to add stripes for connecting to vddp and vss are created in metal layer M6 in Box 2, and vias are created at the intersections between these stripes and nets vddp and vss to connect between metal layers M5 and M6. Likewise, stripes for connecting to vddm and vss are created in metal layer M6 in Box 4, and vias are created at the intersections between these stripes and nets vddm and vss to connect between metal layers M5 and M6. Note that routing blockages are created over boxes 1, 3, and 4 to confine the stripes to box 2 during creation of stripes in box 2.

FIG. 3D illustrates an example of a layer and its first stripe in the Core Grid 210 and how a core grid stripe over the sub-grids can be switched to different generic nets defined by a generic net swap (i.e. stripeswap) description in 306 which is used by compiler to implement a portion of grid 304 that is further used by other power grid tools to implement power grid 308. As shown in this example, the first paragraph of PG Tools Commands (PGAL) 304 creates the part of the core grid stripe in layer M7 which goes over the boxes, Box 1 and Box 3, which do not contain a macro subgrid, and so boxes Box 2 and Box 4 are blocked. Then commands to create the stripe are generated to connect with the generic net name PSC which maps to actual net vdds in this example.

As further shown in FIG. 3D, using the description in 306 for the stripe for connecting with PSC, commands are generated in the second and third paragraphs in 304 for adding stripes using the stripeswap descriptions in 306. The first stripeswap in 306, generates the second paragraph of 304 which contains routing blockages over boxes Box 1, Box 3, and Box 4 (so that the addStripe command will only generate a stripe over Box 2) since this first stripeswap. The second paragraph also contains the commands to generate a stripe using generic net PAM1 which is mapped to net vddp, instead of the default generic net PSC (which maps to actual net vdds). This command to generate the M7 stripe (over Box 2) will also create the vias to connect the vddp M6 stripes created earlier (see FIG. 3C). Similarly, the second stripeswap generates a generic net PAM2 (actual net vddm) layer M7 stripe over SUBGRID5_PAM2 (Box 4) and its associated vias to connect to the previously created M6 vddm wires, instead of connecting to the generic net PSC (actual net vdds) the default net of that core stripe in 306.

FIG. 3E illustrates an example of how description 306 is used by compiler to implement a portion of the core grid 304 that is used to generate an additional set of ground connections over macros in power grid 308. As shown in this example, description 306 specifies a stripe in layer M7 to connect with the generic net name GAC. As set forth above, the generic net name GAC has been mapped to the actual ground net vss. As further shown in FIG. 3E, using the description in 306 for the stripe for connecting with GAC, commands are generated in 304 for adding stripes for connecting with vss in layer M7, which are also shown in Box 1, Box 2, Box 3 and Box 4 in 308. Meanwhile, vias are created at the intersections between these new stripes in layer M7 and stripes in layer M6 connected with net vss in Box 2 for the macro associated with SUBGRID5_PAM1. Likewise, vias are created at the intersections between these new stripes in layer M7 and stripes in layer M6 connected with net vss in Box 4 for the macro associated with SUBGRID5_PAM2. This could be done with one addStripe command in 304 and without blocking any of the boxes if the vias specified in 306 are the same for the core and the subgrids, However, usually different vias are used and so separate addStripe commands are needed for each box.

Example aspects of optimizing a power grid, such as processing that can be performed in connection with step S110 in FIG. 1, will now be described in more detail. It should be noted, however, that the embodiments should not be limited to finding a single, absolute, optimum solution, based on all factors that could possibly or conceivably be considered. Rather, the embodiments further include optimizing a power grid by finding one or more possible improved solutions with respect to one or more factors under consideration.

Figure 4:
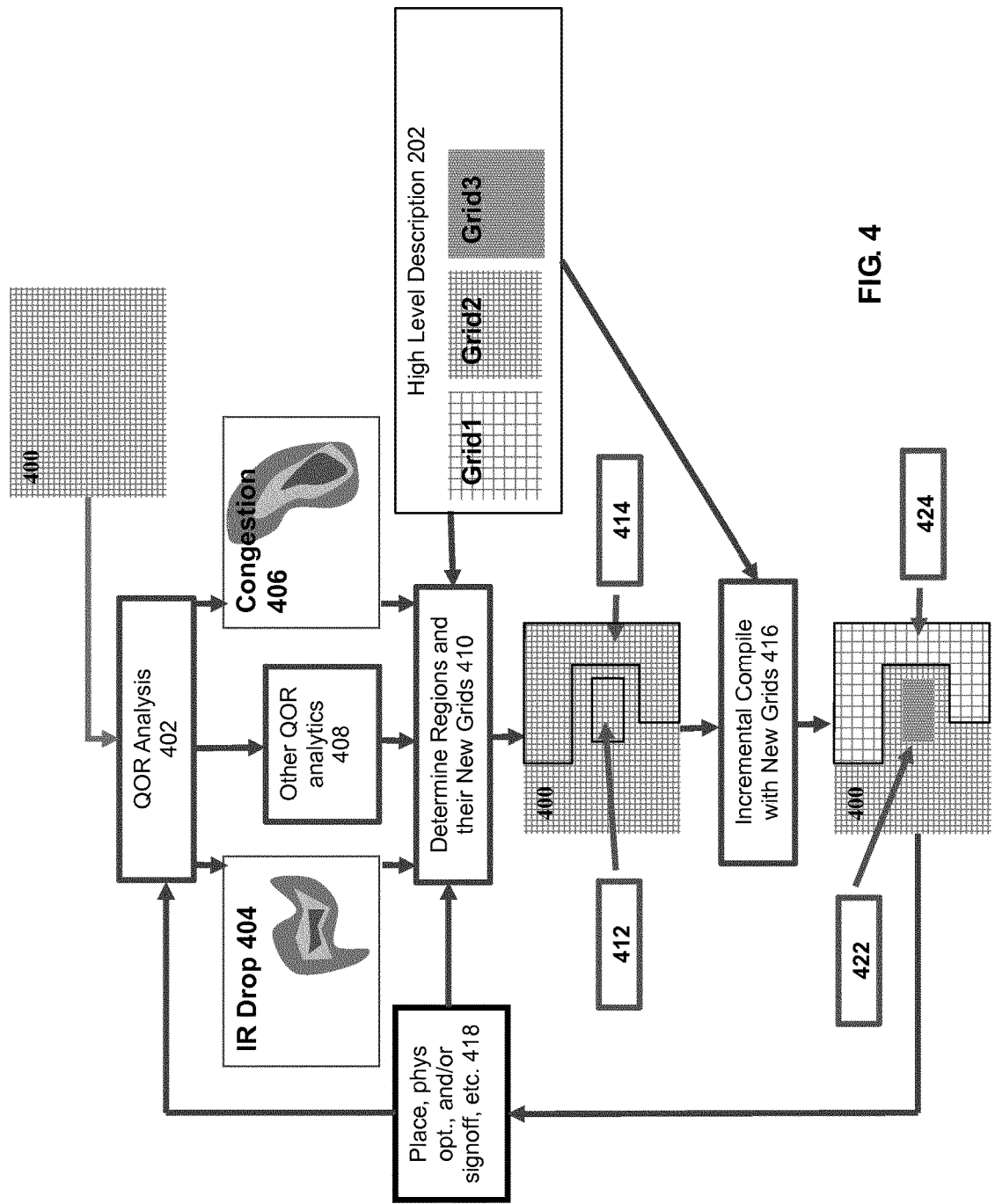
FIG. 4 is a diagram illustrating example aspects of how a power grid compiler according to embodiments can incrementally repair portions of a power grid.

FIG. 4 is a diagram illustrating example aspects of optimizing a power grid according to embodiments. As shown in this example, a sub-chip/block has a power grid 400 that has been generated by a compiler 204 using a description 202 as set forth above.

As shown, power grid optimization according to embodiments can include performing QOR analysis 402 of the overall design, including the sub-chip/block, which has been further placed and optimized as described above in connection with S106 and S108. In this example, QOR analysis 402 can include generating an IR Drop profile 404 for various or all regions of the integrated circuit, including the sub-chip block having power grid 400 and/or generating a congestion profile 406 for various regions or all of the integrated circuit, including the sub-chip block having power grid 400. As those skilled in the art will appreciate, these profiles 404 and 406 allow designers to identify specific physical regions and layers of an integrated circuit design that are potentially problematic. As shown, QOR analysis 402 can further include other analytics 408 such as identifying timing hot spots (i.e. regions which contain components that limit the final overall circuit performance), identifying thermal hot spots, etc. Any or all of these QOR analytics 402 can be performed by any conventional means known to those skilled in the art. It should be noted that in some embodiments, only a certain one or more of the analytics 404, 406 and 408 is performed.

Based on the results of the analytics 402, the power grid optimizer 410 can identify boundaries of regions 412, 414 of sub-chip 400 that are problematic. In this example, regions 412 and 414 are problematic for different reasons, for example region 412 having bad IR drop and region 414 having little IR drop but bad congestion. Accordingly, the power grid optimizer can specify new auxiliary grids for the power grid 400 in these regions 412 and 414, a first sparse grid (Grid 1) for region 414 having a wider spacing between stripes than the existing spacing (Grid 2), and a second dense grid (Grid 3) for region 412 having a smaller spacing between stripes. This can be done using the high level description 202 techniques as described above. In other embodiments, there could be a LEF macro for each grid type, the width and length of the grid LEF macro being a multiple of the gridCell width and length. Then the incremental Compiler 416 could remove the existing grid for the gridCell to be changed, instance the grid LEF macros to cover the changed gridCell, and then flatten the grid LEF macros. This embodiment would be preferential for very simple designs. But for the more complex designs of today's advanced technologies, the High Level Description 202 embodiment is preferred.

The power grid for these new auxiliary grids 422, 424 for sub-chip 400 is then re-generated incrementally as described above. Some or all of the processing to place and optimize cells and generate the actual wires and vias which are not for the power grids as described above in connection with steps S106 and S108 is then performed in 418, and the resulting revised design can then be analyzed again in 402 as described above. This iteration can continue until a satisfactory solution has been obtained, however this is not necessary in all embodiments. As shown in the example of FIG. 4, embodiments can also include branching back to power grid optimizer 410 which can identify new regions and grids based on the results of the processing performed in 418.

In some embodiments, power grid optimizer 410 includes user interface functionality or constructs to allow a designer to control, configure or otherwise interact with an optimization process performed by power grid optimizer 410. In this regard, FIGS. 5A to 5C illustrate some example user interface constructs according to these and other embodiments.

Figure 5A:
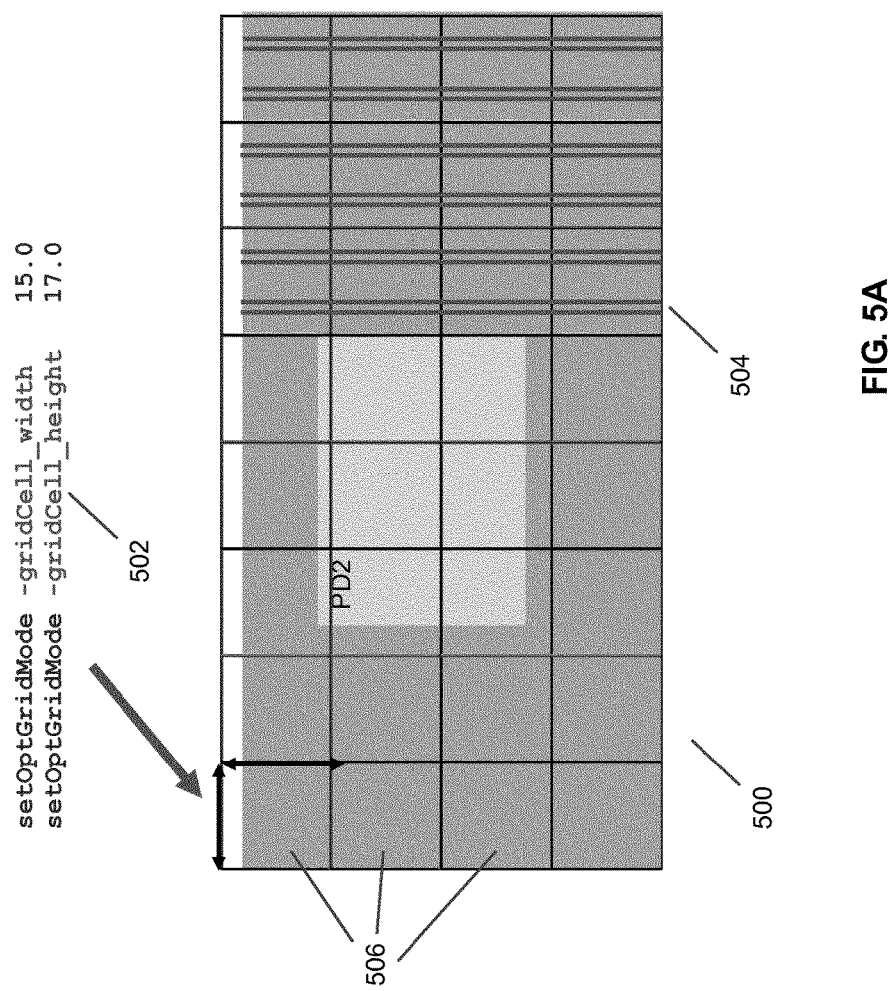

As shown in the example of FIG. 5A, a design 500 includes a power domain named PD2. As further shown in this example, the user interface includes constructs 502 that allow a designer to specify the height and width of a smallest window (e.g. in microns) that power grid optimizer 410 can consider for incrementally changing the power grid as described above. In embodiments shown in FIG. 5A, the width of this smallest window should preferably be a multiple of the required pitch of high level description for power grid stripes 504 for a given metal layer so that the grid can be cleanly cut and repaired if such repair is indicated by power grid optimizer 410. The design 500 is then broken up into grid cells 506 each described by width, height (both specified by constructs 502), origin_x, origin_y.

As further shown in the example of FIG. 5B, a grid optimizer user interface can include constructs such as TCL procedures 508 for allowing a designer to control grid changes performed by power grid optimizer 410. This TCL procedure is passed gridCell_x and gridCell y, which are integer values indicating the specific grid cell, and the procedure returns the name of the optimal grid for that grid cell. In this example, constructs 510 include APIs that provide information on a given grid cell (e.g. IR Drop and congestion information in this example). As further shown in this example, constructs 512 allow a designer to use the grid cell specific information to specify conditions to specify and return the optimal power grid name for that grid cell. Finally, the command 'optGrid' 514 calls the power grid optimizer 410.

Still further, the example in FIG. 5C shows a more comprehensive list of possible APIs 510 that provide information on a given grid cell according to embodiments. Notice that some optional values are shown in brackets, in which specific values are given to the API, but if no specific value is given, the API assumes all possible values. For example, in construct 516, [$domain] means domain is optional, and if not given, the API will return value(s) consistent with all domains present in the gridCell. As another example, in construct 518, [$layer] means layer is optional, and if not given, the API will return a value for all layers. In general, the APIs according to embodiments provide useful information for performing power grid optimization according to embodiments, such as construct 520 which returns the lowest rail voltage of all the instances touching the gridCell.

As shown in the example of FIG. 5D, power grid repair commands 522 are the output of the power grid optimizer 410 and serve as directives to the power grid compiler tool 416 to incrementally change the grid. The power grid repair commands 522 in these examples allow specification of boxes of grid cells that need different grids, which can then be used for power grid repair by power grid compiler 416 incrementally.

Figure 6:
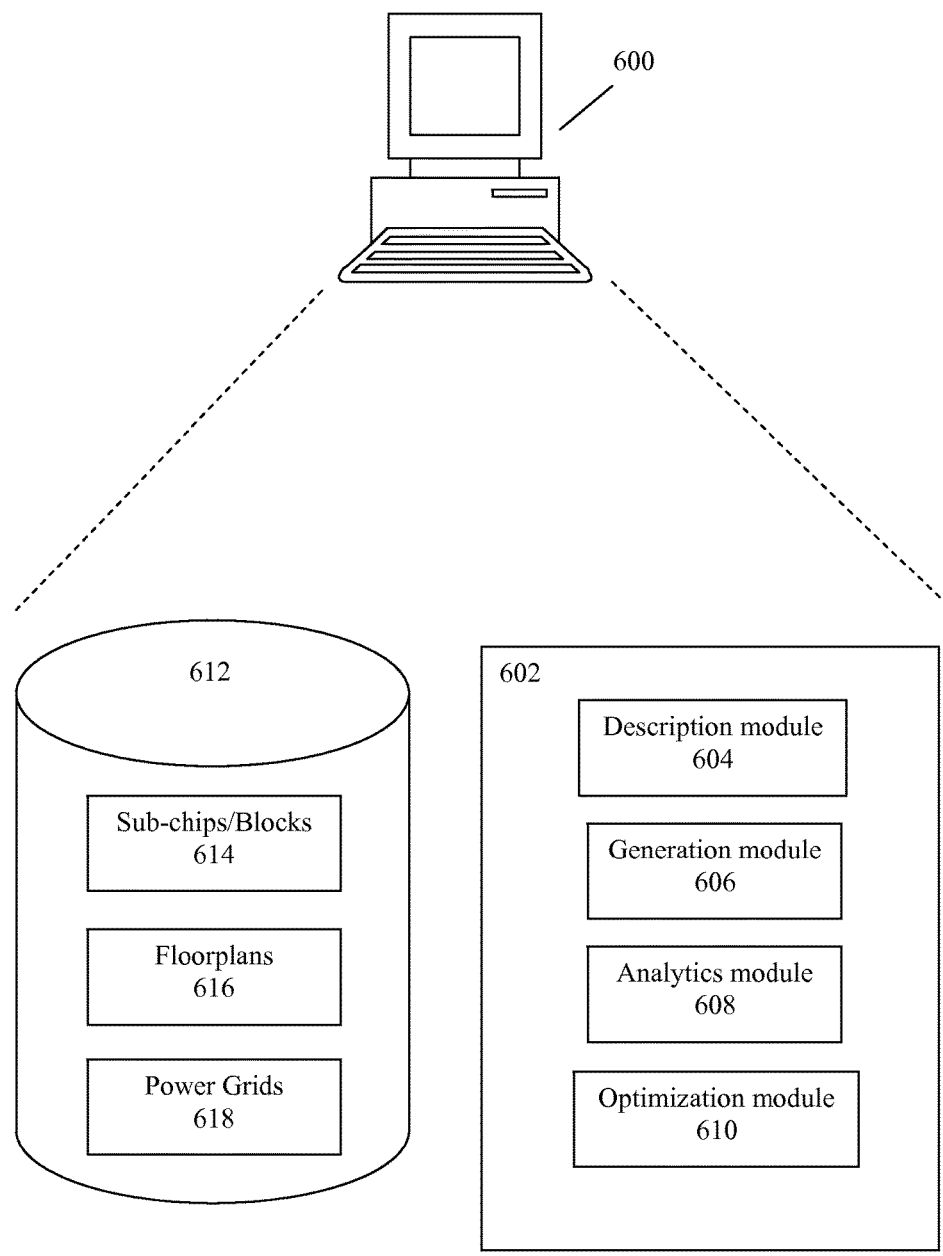
FIG. 6 is a diagram illustrating an example system according to embodiments.

FIG. 6 is a block diagram of an example system for generating optimized power grids according to the present embodiments.

In embodiments, the system 600 can be one or more general purpose computers that are loaded with software (e.g, EDA tools) and/or customized to include hardware for interactively implementing physical electronic designs. In some embodiments, the one or more computing systems 600 comprise various components not shown such as processor(s) or processor core(s), memory, disks, etc. The software and/or custom hardware may include interactive or automated modules such as a placer, a routing engine, a layout editor, a design rule checker, a verification engine, a power integrity engine and/or a floorplanner, etc. as will be appreciated by those skilled in the art. The one or more computing systems 600 may further write to and read from a local or remote volatile or non-volatile computer accessible storage 612 that stores thereon data or information such as, but not limited to, one or more databases such as electronic circuit design database(s) including designs 614 for sub-chips and blocks of an integrated circuit, floorplans 616, and/or power grids 618 (e.g., PGAL files, floorplan files, high level power grid design language files, etc.) that may be required to support the methodology of the present embodiments. In some embodiments, the one or more computing systems are implemented in a "cloud" configuration and/or a client/server configuration. For example, one or more server computers may be loaded with application software (e.g., an implementation system) for implementing some or all of the methodology of the present embodiments, and one or more client computers can communicate with the server computer(s) via a network to perform some or all of the methodology of the embodiments for a particular design. It should be noted that certain of the information in storage 612 may not necessarily be stored in permanent form, so storage 612 should not be construed as limited to such permanent storage. For example, in some embodiments PGAL may only exist in an intermediate form which could be, but not necessarily written to disk. In these and other embodiments, information such as intermediate PGAL commands may be consumed by one module or tool almost immediately after it is generated by another module or tool, without being stored permanently.

In some embodiments, the one or more computing systems 600 may, by various standalone software, hardware modules or combinations thereof 602 (e.g., EDA tool), include a description module 604 to identify and create (e.g. providing a user interface allowing a designer to create files for various sub-chips/blocks) high level descriptions 202 of power grids for sub-chips/blocks 614 and a power grid generation module 606 (e.g. power grid compiler 204) for generating power grids 618 in accordance with the present embodiments. Modules 602 according to further embodiments shown in FIG. 6 further include an analytics module 608 and an optimization module 610 for performing the incremental power grid optimization processing such as described above in connection with FIG. 4. Additionally or alternatively, any or all of modules 604, 606, 608 and 610 may be implemented by adapting certain pre-existing modules (e.g, placer, floorplanner, implementation system, signoff tool, etc.) with additional functionality as may be required to implement optimal power grids and to physically implement electronic designs according to the present embodiments and as described above. Those skilled in the art will be able to understand how to implement various examples of such modules after being taught by the present disclosure.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method for implementing a power grid for a portion of an integrated circuit design, the power grid comprising a plurality of wires and vias that electrically connect to power pins and ground pins of components in the integrated circuit design, the method comprising:
  receiving, by one or more circuit design tools, a high level description of the power grid;
  automatically generating, by the one or more circuit design tools, first commands for creating hardware descriptions of the wires and vias of the power grid based on the received high level description;
  placing one or more standard cells in the integrated circuit design, including electrically connecting power pins and ground pins of the standard cells to the power grid in the integrated circuit design;
  performing, by the one or more circuit design tools, analytics on the integrated circuit design including the placed one or more standard cells and the power grid;
  optimizing, by the one or more circuit design tools, the power grid based on the performed analytics using the high level description, the optimized power grid including second different commands for creating hardware descriptions of the wires and vias of the power grid; and
  fabricating an integrated circuit in accordance with the the integrated circuit design and having the optimized power grid.

2. The method of claim 1, wherein optimizing includes:
  receiving an identification of a specific portion of the power grid based on the performed analytics; and
  incrementally repairing the specific portion of the power grid without affecting other portions of the power grid.

3. The method of claim 1, wherein the analytics comprise quality of results (QOR) analytics.

4. The method of claim 1, wherein the analytics comprise determining IR drop in one or more regions of the integrated circuit design.

5. The method of claim 1, wherein the analytics comprise determining congestion in one or more regions of the integrated circuit design.

6. The method of claim 1, wherein the analytics comprise determining timing hot spots in one or more regions of the integrated circuit design.

7. The method of claim 1, wherein the analytics comprise determining thermal hot spots in one or more regions of the integrated circuit design.

8. The method of claim 1, wherein the high level description includes a core grid and one or more sub grids that refer to the core grid.

9. The method of claim 1, wherein the high level description includes a generic net name, and wherein automatically generating includes mapping the generic net name to a specific power net for a sub-chip in the integrated circuit.

10. The method of claim 9, wherein the generic net name comprises a generic name of one of power for a standard cell, ground, power always-on and power for memory.

11. The method of claim 8, wherein one or both of the core grid and the sub grid comprises one or more layer objects.

12. The method of claim 11, wherein each of the one or more layer objects comprises one or more of a metal name, a width, a pitch, an offset origin, and a stripe object.

13. The method of claim 12, wherein the stripe object comprises one or more of a width, an offset, an offset origin, and a pitch specification.

14. A method for implementing a power grid for a portion of an integrated circuit design, the power grid comprising a plurality of wires and vias that electrically connect to power pins and ground pins of components in the integrated circuit design, the method comprising:
  identifying a first design of the power grid, wherein the first design includes a high level description of the power grid, the first design of the power grid further including first commands for creating hardware descriptions of the wires and vias of the power grid based on the high level description;
  placing one or more standard cells in the integrated circuit design, including electrically connecting power pins and ground pins of the standard cells to the power grid in the integrated circuit design;
  performing analytics on the integrated circuit design including the placed one or more standard cells and the power grid;
  optimizing the power grid based on the performed analytics using the high level description, wherein optimizing includes identifying a second design of the power grid including second commands creating hardware descriptions of the wires and vias of the power grid based on the high level description; and
  fabricating an integrated circuit in accordance with the the integrated circuit design and having the optimized power grid.

15. The method of claim 14, wherein optimizing includes identifying a specific portion of the power grid based on the performed analytics.

16. The method of claim 15, wherein optimizing further includes identifying the second design of the power grid based on the identification of the specific portion of the power grid.

* * * * *